April 27, 1926.
J. DE LOPATTO
VEHICLE WHEEL
Filed April 18, 1925
1,582,814
4 Sheets-Sheet 1
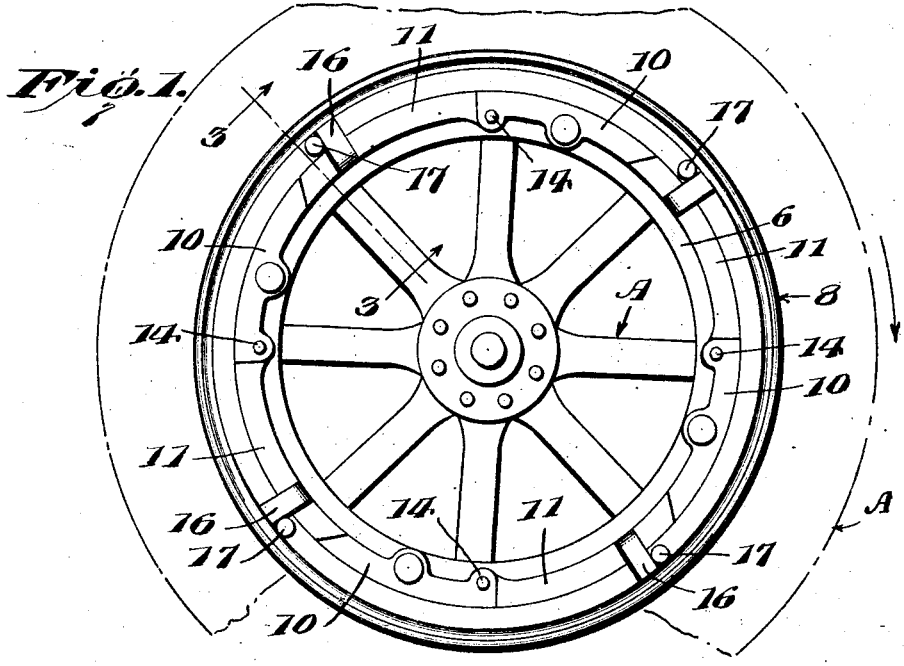
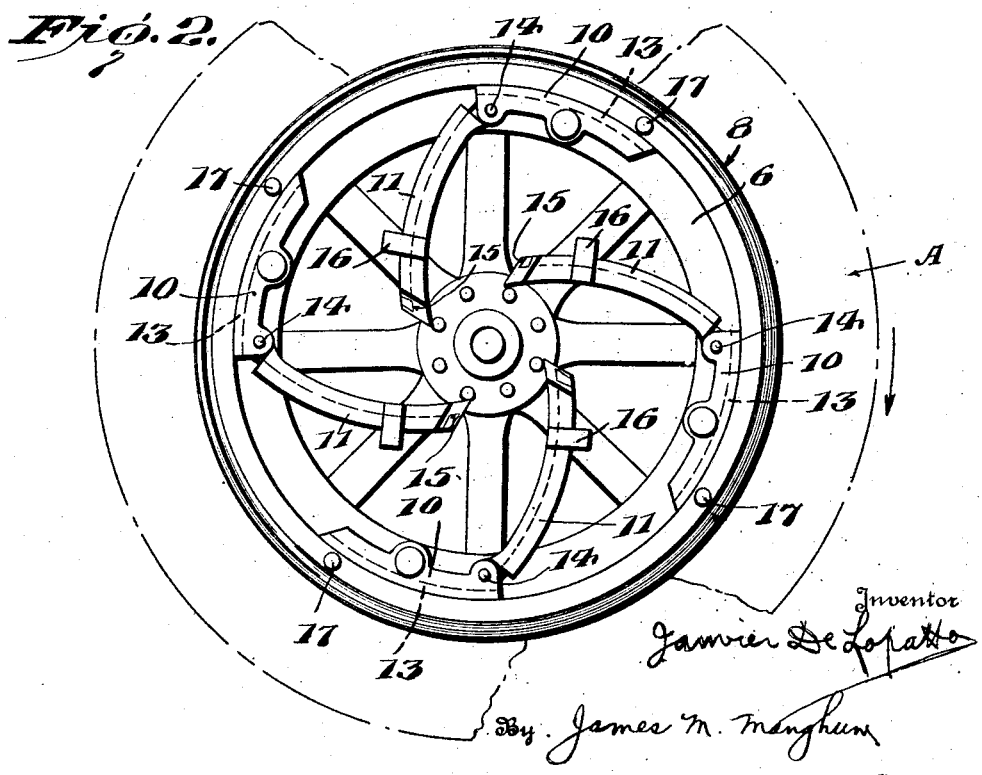
Inventor
Janvier De Lopatto
By James M. Manghum
Attorney April 27, 1926.

J. DE LOPATTO

VEHICLE WHEEL

Filed April 18, 1925   4 Sheets-Sheet 2

1,582,814

Inventor
Janvier De Lopatto
By James M. Mangham
Attorney

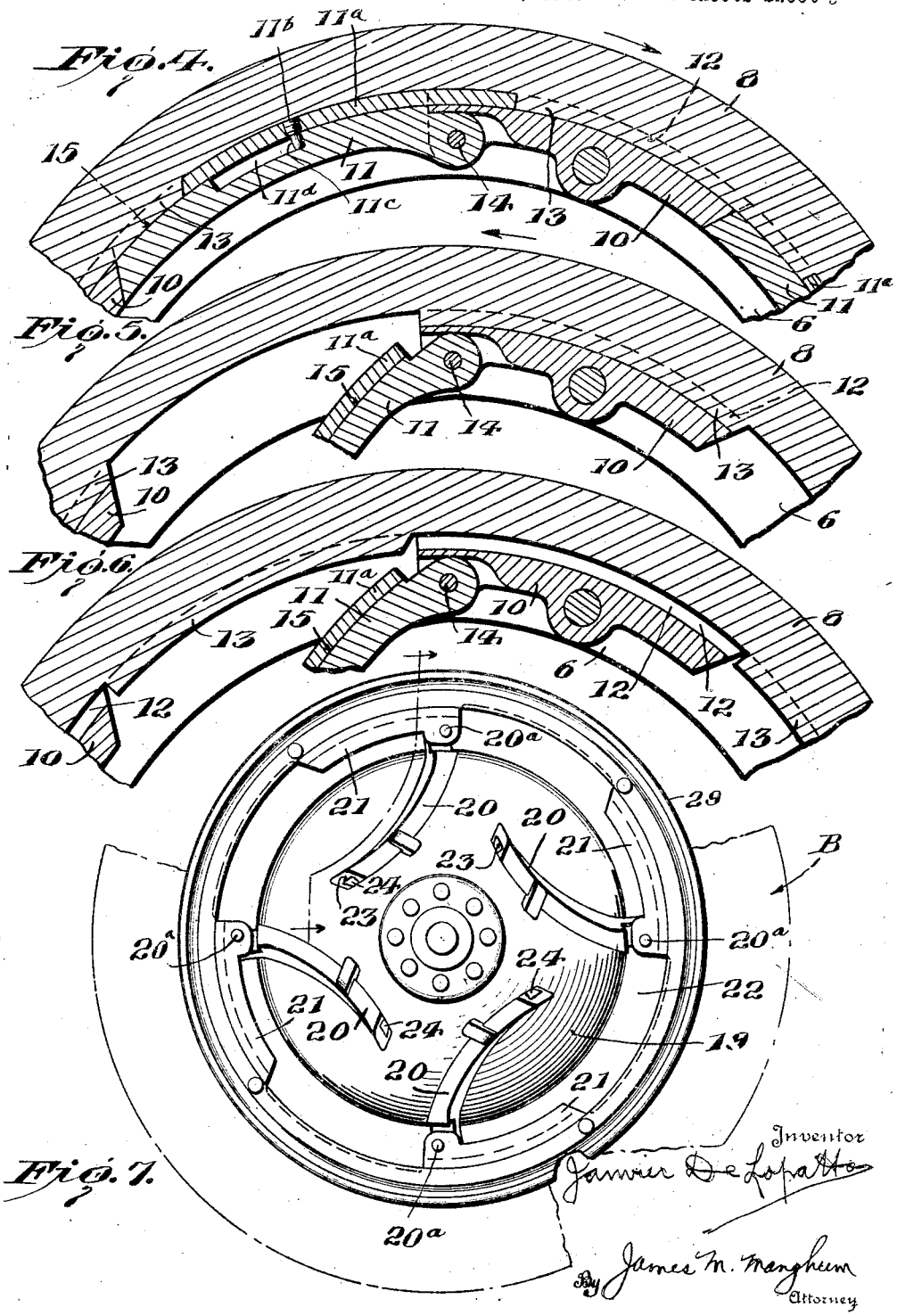

April 27, 1926.
J. DE LOPATTO
VEHICLE WHEEL
Filed April 18, 1925
1,582,814
4 Sheets-Sheet 4
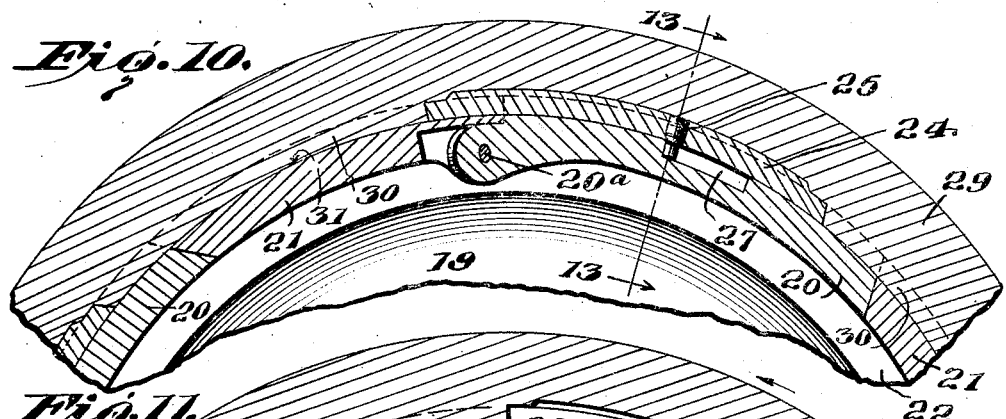
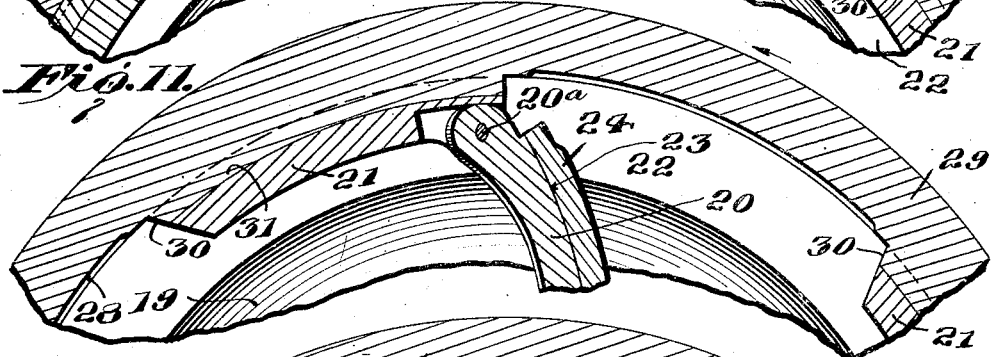
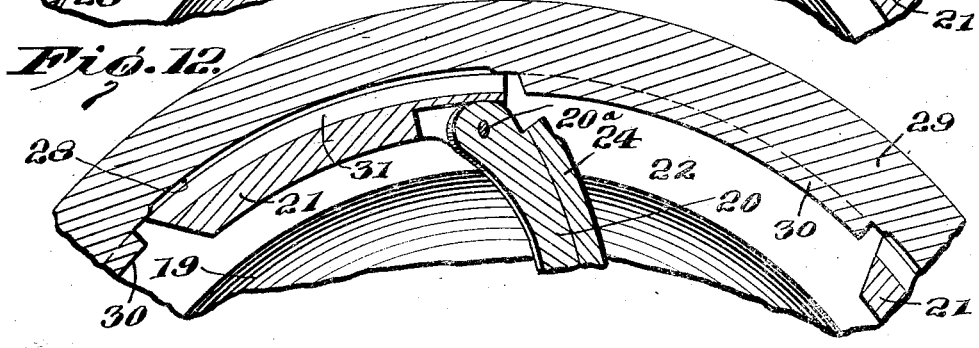
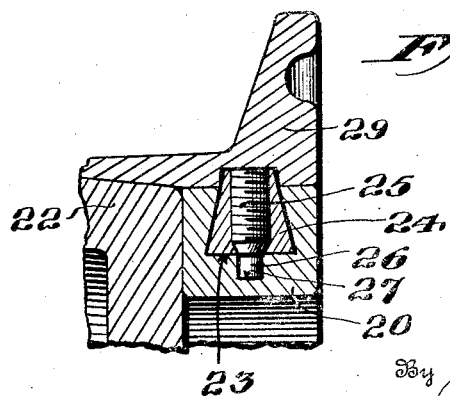
Janvier De Lopatto
Inventor
By James M. Maughin
Attorney Patented Apr. 27, 1926.

1,582,814

UNITED STATES PATENT OFFICE.

JANVIER DE LOPATTO, OF WASHINGTON, DISTRICT OF COLUMBIA.

VEHICLE WHEEL.

Application filed April 18, 1925. Serial No. 24,062.

*To all whom it may concern:*

Be it known that I, JANVIER DE LOPATTO, a citizen of the United States, residing at Washington, District of Columbia, have invented certain new and useful Improvements in Vehicle Wheels, of which the following is a specification.

This invention relates to new and useful improvements in vehicle wheels generally, although more particularly to removable rim flanges thereof.

One of the principal objects of my invention is to provide a wheel rim having a removable flange which will permit of the ready attachment of a tire or removal thereof without the necessity of employing clamping lugs, bolts, and so forth, and which will require a minimum amount of effort and time.

Another object of my invention lies in the provision of a detachable rim which may be employed with either a spoke wheel or a disk wheel.

With the above and other objects in view which will more readily appear as the nature of the invention is better understood, the same consists in the novel construction, combination and arrangement of parts hereinafter more fully described, illustrated and claimed.

In the accompanying drawings, which illustrate two forms of my invention,

Figure 1 is a view in elevation of a vehicle wheel of the spoke type equipped with my improved removable rim.

Figure 2 is a similar view but showing the rim moved to a position to release the latches.

Figure 4 is an enlarged sectional view taken in the plane of the wheel and showing the flange in its locked position on the rim.

Figure 5 is a similar view but showing the flange moved to a position for releasing the latch.

Figure 6 is a similar view but showing the flange moved to a position on the rim whereby said flange may be removed therefrom.

Figure 7 is a plan view of a disk wheel showing the application of a modified form of my invention thereto.

Figure 10 is an enlarged detail sectional view taken in the plane of the wheel and showing the flange in its locked position relative to the rim.

Figure 11 is a similar view but showing the flange moved to a position whereby the latch is released.

Figure 12 is a similar view but showing the flange in a position on the rim to be readily removed therefrom, and Figure 13 is an enlarged detailed sectional view taken on the line 13—13 of Figure 10.

Like numerals designate corresponding parts throughout all figures of the drawings.

Figures 3, 8:
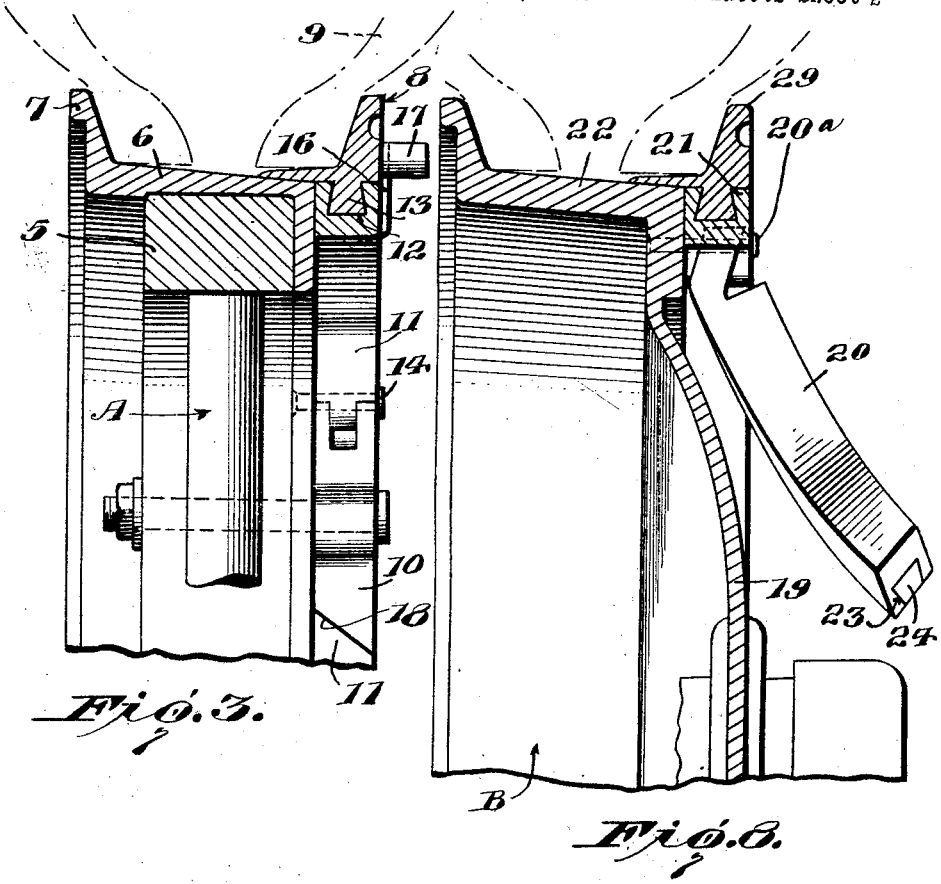
Figure 3 is an enlarged detail sectional view taken on the line 3—3 of Figure 1.
Figure 8 is an enlarged detail sectional view taken on line 8—8 of Figure 7.

Referring to the accompanying drawings, and particularly to Figures 1 to 6 thereof, I have illustrated a wheel "A" of the spoke type. This wheel includes a felly 5 which may be of any suitable construction and fixedly secured to this felly by bolts or the like is a rim 6 having the usual integral inner flange 7 arranged in the general plane of the wheel. A removable flange 8 is associated with the rim 6 for the purpose of cooperating with the flange 7 for securing a tire casing 9 therebetween.

The rim 6 is formed with a plurality of laterally extending projections 10 which are spaced apart for receiving the latches 11. The rim projections 10 are respectively formed in their outer faces with circumferential grooves 12, as particularly shown in Figures 2 and 6. The flange 8 is formed with a plurality of spaced and inwardly extending tongues 13, the lengths of the respective tongues being slightly less than the width of the spaces between the rim projections 10. The grooves 12 are dove-tailed in cross-section and the tongues 13 are correspondingly shaped and are freely slidable therein. The latches 11 are each pivoted at one end as at 14 to one end of a rim projection 10, and the length of the latch is such as to fit within the corresponding space between said rim projections. These latches 11, when in their locked positions, as shown particularly in Figure 4, form a continuation of the projections 10, the outer faces of the latches being respectively formed with circumferentially extending grooves 15 which correspond in cross-section to the grooves 12 of said projections. When the latches 11 are in their locked positions the grooves 15 thereof align with the grooves 12 and consequently the tongues 13 of the flange 8 may have free sliding contact relative thereto. Slidably mounted in the latch grooves 15 are locking pins 11ᵃ, their endwise movements being limited by screws 11ᵇ carried by the pins and having reduced extensions 11ᶜ which engage in the grooves 11ᵈ formed in the inner face of the flange 8.

In operation, assuming that it is desirable to attach the removable flange 8 to the rim, said flange is positioned on the rim whereby the locking tongues 13 are respectively disposed intermediate the spaced rim projections 10, and said flange is then shifted rearwardly toward the back flange 7. This initial position of the flange is shown particularly in Figure 6, the latches 11, of course, being swung toward the center of the wheel as shown in Figure 2. The flange 8 is then moved circumferentially in the direction indicated by the arrow in Figure 5, the tongues 13 of the flange moving into the grooves 12 of the rim projections. Thus the spaces between the tongues 13 registered with the spaces between the rim projections 10 and consequently the latches 11 are free to be positioned within said spaces whereby the grooves 15 of said latches will align with the grooves 12 of the rim projections. The flange 8 is then moved circumferentially in the opposite direction, that is, in the direction indicated by the arrow in Figure 4, thus causing the ends of the tongues of the flange to be moved into the adjacent ends of the grooves 15 of the latches. The tongues are thereby caused to move the locking pins 11ᵃ endwise to bridge the same across the hinges of the latches, a part of each pin entering the groove 12 of the adjacent rim projection and the other part remaining in the latch groove 15. Thus said latches are retained against accidental movement. This position of the tongues 12 retains the latches 11 in their locked position and thereby prevents said tongues 12 from registering with the spaces between the rim projections 10 and consequently said flange is positively retained in interlocking engagement with said rim.

In order to prevent the detachable flange 8 from creeping, I have provided said latches 11 with radially extending lugs 16 which project in front of the flange 8 and serve as stops for pins 17 fixedly secured to said flange. Thus the wheel rotating in the direction of the arrow shown in Figure 1 will cause said pins 17 to contact with the lugs 16 and thereby prevent circumferential movement of the flange 8 in one direction relative to said rim.

In order to insure the grooves 15 of the latches 11 aligning with the grooves 12 of the rim projections, I have undercut the ends of the projections 10 adjacent the free ends of the latches, as shown by 18, and have correspondingly shaped said adjacent ends of the latches 11.

Figure 9:
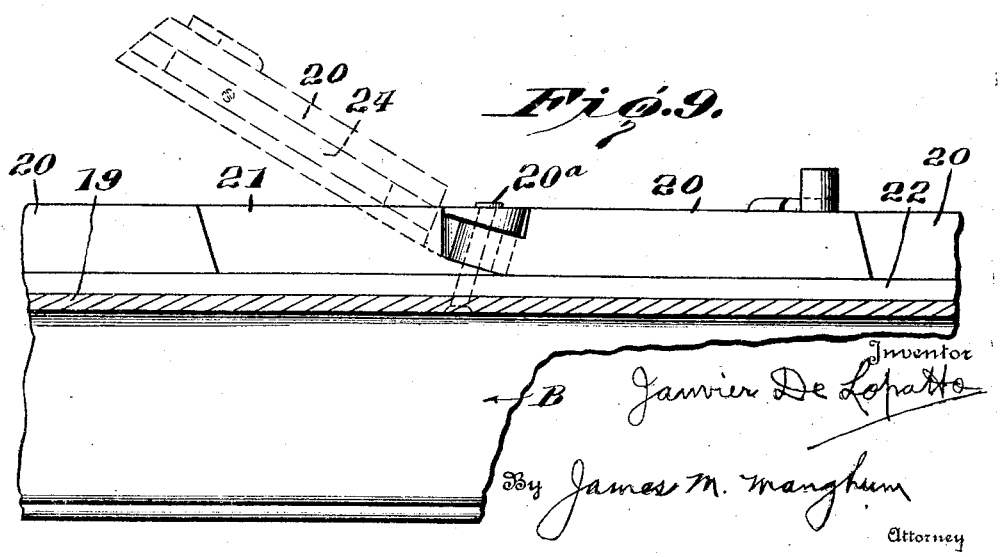
Fig. 9 is an enlarged detail sectional view showing the latch in full lines in its locked position and in dotted lines the open position thereof.

In the construction shown in Figures 7 to 13, I have illustrated a wheel "B" of the disk type and have applied by invention thereto. In this form the wheel is provided with an outwardly dished disk 19 and consequently I have pivotally connected the latches 20 to the rim projections 21 of the rim 22, by means of pivots 20ᵃ which are inclined to the vertical so as to permit said latches when being moved from their locked positions to swing upwardly as well as inwardly and thereby clear the dished portion of the disk 19. The latches 20 are formed in their outer peripheral faces with circumferential grooves 23 which are dove-tailed in cross sectional shape. Slidably mounted in each groove is a locking pin 24. Each pin is mounted for limited endwise movements through the medium of a screw 25 which extends radially of the latch and is provided with a reduced extension 26 which fits within a groove 27 formed in the latch 20. It will be noted that the length of the groove 27 is comparatively short relative to the length of the latch and consequently a limited endwise movement of the locking pin 24 is obtained.

Furthermore, the locking pins 24 extend above the grooves 23 of the latches to form projecting tongues which respectively fit within correspondingly shaped circumferential grooves 28 formed in the removable flanges 29 between the spaced tongues 30 thereof.

Inasmuch as all of the other parts of this second construction are similar to the corresponding parts in the structure first described, it is thought to be unnecessary to repeat the description.

Therefore, in operation of this second form of my invention, when it is desired to apply the flange 29, the latches 20 are first moved inwardly to the position shown in Figure 7, the inclined pivots 20ᵃ permitting the latches to clear the disc 19. The flange is then positioned on the rim so that the spaced tongues 30 fit between the rim projections 21 and align with the circumferential grooves 31 of the rim projections 21. The flange 29 is then moved toward the left as indicated by the arrow in Figure 11, and the latches 20 are then swung into the spaces between the rim projections, the projecting portions of the locking pins 24 being simultaneously positioned to have interlocking engagement with the removable flange 29 through the medium of the grooves 28. The flange 29 is then moved circumferentially in the opposite direction and this movement causes the tongues 30 to engage the locking pins 24 of the latches and move said pins so as to project their opposite ends into the adjacent grooves 31 of the rim projections, the locking pins 24 thereby bridging the adjacent free ends of the latches 20 and the adjacent ends of the rim projections. Therefore, the extent of movement of the locking pin in its locking engagement with the rim projections is limited by the screw 25 and the cooperating groove 27.

From the foregoing it will be seen that I have provided a wheel embodying either the spoke or disk type with a detachable flange which may be readily removed or placed in position without the aid of any specific tools and which can be so manipulated with a minimum amount of effort and time.

Having thus described my invention what I claim as new is:—

1. In a wheel, the combination with a rim, of a removable flange circumferentially movable on said rim in one direction for interlocking engagement therewith, and latches pivoted to said rim for interlocking engagement with said flange upon circumferential movement thereof in the opposite direction.

2. In a wheel, the combination with a rim, of a removable flange circumferentially movable on said rim in one direction for interlocking engagement therewith, latches pivoted to said rim for interlocking engagement with said flange upon circumferential movement thereof in the opposite direction, and a stop fixed to said flange to limit the circumferential movement of the flange in said opposite direction.

3. In a wheel, the combination with a rim, of a removable flange circumferentially movable on said rim in one direction for interlocking engagement therewith, latches pivoted to said rims for interlocking engagement with said flange upon circumferential movement thereof in the opposite direction, said latches being pivoted upon axes substantially parallel with the axis of the rim whereby said latches will swing inwardly towards said axis of the rim.

4. In a wheel, the combination with a rim having spaced lateral projections formed with aligned peripheral grooves extending circumferentially of said rim, of a flange removably mounted on said rim for circumferential movements relative thereto and having spaced tongues extending inwardly therefrom for interlocking connection with the grooves of said rim projections upon circumferential movement of said flange in one direction, and latches pivotally connected to said rim and respectively movable into the spaces between the rim projections for interlocking engagement with said flange upon circumferential movement thereof in the opposite direction.

5. In a wheel, the combination with a rim having spaced lateral projections formed with aligned peripheral grooves extending circumferentially of said rim, of a flange removably mounted on said rim for circumferential movements relative thereto and having spaced tongues extending inwardly therefrom for interlocking connection with the grooves of said rim projections upon circumferential movement of said flange in one direction, and latches pivotally connected to said rim and respectively movable into the spaces between the rim projections for interlocking engagement with said flange upon circumferential movement thereof in the opposite direction, said latches being respectively formed in their outer faces with circumferential grooves for receiving the tongues of said rim.

6. In a wheel, the combination with a rim having spaced lateral projections formed with aligned peripheral grooves extending circumferentially of said rim, of a flange removably mounted on said rim for circumferential movements relative thereto and having spaced tongues extending inwardly therefrom for interlocking connection with the grooves of said rim projections upon circumferential movement of said flange in one direction, and latches pivotally connected to said rim and respectively movable into the spaces between the rim projections for interlocking engagement with said flange upon circumferential movement thereof in the opposite direction, said latches being respectively formed in their outer faces with circumferential grooves for receiving the tongues of said rim, all of said tongues and grooves being dove-tailed in cross-section.

7. In a wheel, the combination with a rim having spaced lateral projections formed with aligned peripheral grooves extending circumferentially of said rim, of a flange removably mounted on said rim for circumferential movements relative thereto and having spaced tongues extending inwardly therefrom for interlocking connection with the grooves of said rim projections upon circumferential movement of said flange in one direction, and latches pivotally connected to said rim and respectively movable into the spaces between the rim projections for interlocking engagement with said flange upon circumferential movement thereof in the opposite direction, the free ends of said latches and the adjacent ends of the rim projections being shaped to retain said latches against outward lateral movement.

8. In a wheel, the combination with a rim having spaced lateral projections formed with aligned peripheral grooves extending circumferentially of said rim, of a flange removably mounted on said rim for circumferential movements relative thereto and having spaced tongues extending inwardly therefrom for interlocking connection with the grooves of said rim projections upon circumferential movement of said flange in one direction, the lengths of the respective tongues being slightly less than the respective spaces between said rim projections, and latches pivotally connected to said rim and respectively movable into the spaces between the rim projections for interlocking engagement with said flange upon circumferential movement thereof in the opposite direction.

9. In a wheel, the combination with a rim having spaced lateral projections formed with aligned peripheral grooves extending circumferentially of said rim, of a flange removably mounted on said rim for circumferential movements relative thereto and having spaced tongues extending inwardly therefrom for interlocking connection with the grooves of said rim projections upon circumferential movement of said flange in one direction, and latches pivotally connected to said rim and respectively movable into the spaces between the rim projections for interlocking engagement with said flange upon circumferential movement thereof in the opposite direction, said latches being respectively formed in their outer faces with circumferential grooves for receiving the tongues of said rim, a radially extending lug carried by one of said latches and an outwardly extending pin fixed to the flange for engagement with said lug to limit the circumferential movement of said rim in one direction.

10. The combination with a wheel including a rim and an outwardly dished disk, said rim having spaced lateral projections formed with aligned peripheral grooves extending circumferentially of said rim, of a flange removably mounted on said rim for circumferential movements relative thereto and having spaced tongues extending inwardly therefrom for interlocking connection with the grooves of said rim projections upon circumferential movement of said flange in one direction, said flange being formed with circumferential grooves respectively disposed between the inwardly extending tongues, and latches pivotally connected to said rim and respectively movable into the space between the rim projections for interlocking engagement with said flange upon circumferential movement thereof in the opposite direction, said latches being respectively formed in their outer faces with circumferential grooves, and locking pins slidably mounted in said latch grooves and movable into said grooves of said rim projections during the circumferential movement of the flange in said opposite direction.

In testimony whereof I hereunto affix my signature.

JANVIER DE LOPATTO.